March 5, 1940.　　J. MOORES ET AL　　2,192,796
DUSTLESS HOPPER
Filed Jan. 27, 1938　　2 Sheets-Sheet 2

INVENTORS
Joel Moores
Thomas P. McClanahan
BY
Murray, Sackhoff, Zugelter & Paddack
ATTORNEYS Patented Mar. 5, 1940

2,192,796

UNITED STATES PATENT OFFICE 2,192,796

DUSTLESS HOPPER

Joel Moores and Thomas P. McClanahan, Cincinnati, Ohio, assignors to The J. H. Day Company, Cincinnati, Ohio, a corporation of Ohio Application January 27, 1938, Serial No. 187,334

11 Claims. (Cl. 221—145)

This invention relates to a hopper for use in the handling of powders or more or less finely divided materials which tend to liberate dust when subjected to agitation or movement.

An object of the invention is to provide a simple, inexpensive, and effective means for preventing the escape of dust into the surrounding atmosphere during use of the hopper, and to facilitate cleaning or replacement of said means.

Another object of the invention is to so construct and arrange a dust arresting means in association with a hopper, as to make it perform several functions in a simple and effective manner, with the use of a minimum of simple and inexpensive constituents.

A further object of the invention is the provision of novel and highly effective valve or gate means for the upper and lower ports of the hopper, and of controls for said means.

A further object is to provide an improved form of discharge port structure and seal therefor.

These and other objects are attained by the means described herein and disclosed in the accompanying drawings, in which.

Figure 1:
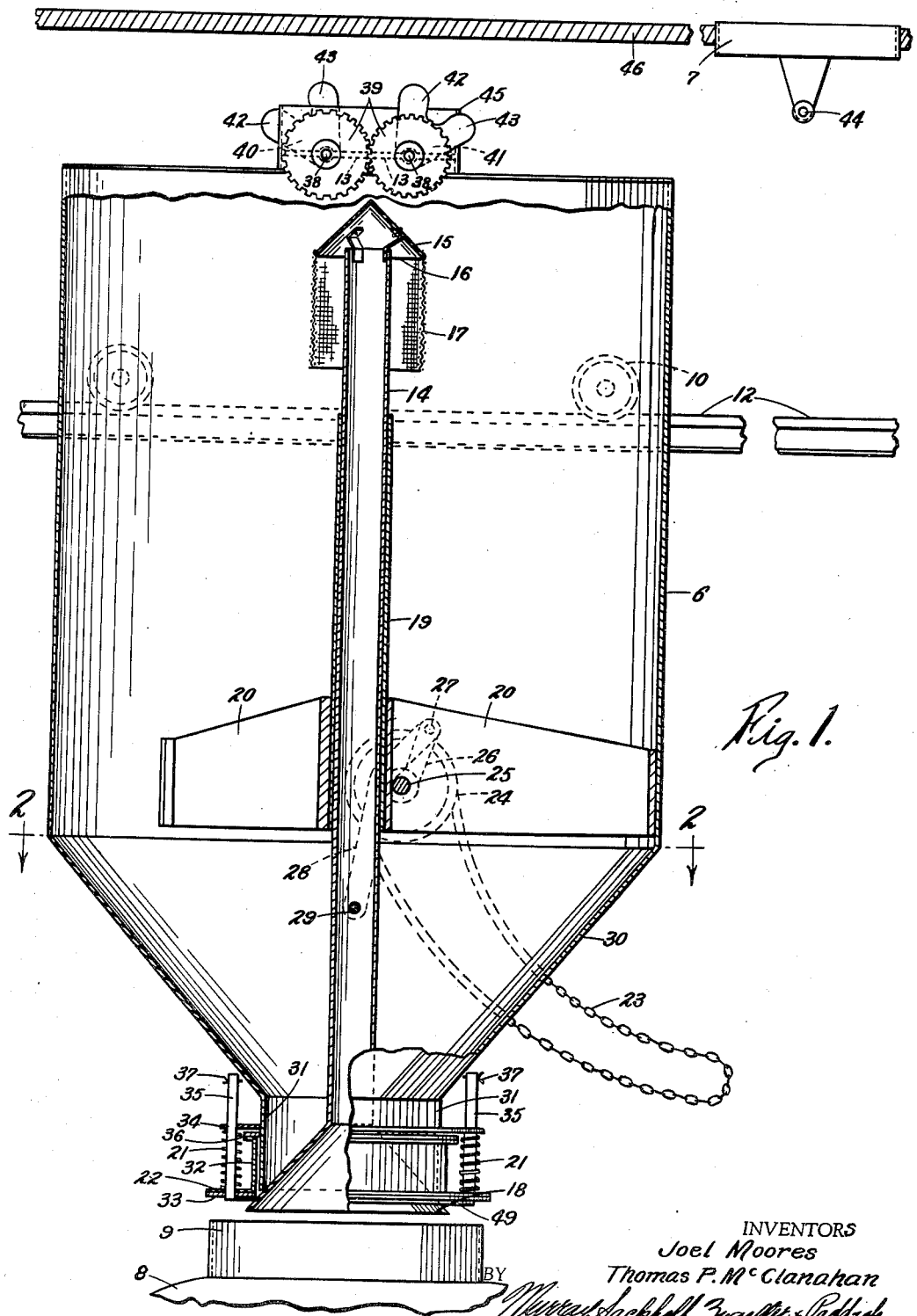
Fig. 1 is a vertical cross-section, part being shown in elevation, disclosing the hopper of the invention.

Fig. 1 of the accompanying drawings illustrates in general a hopper comprising a receptacle 6 which is movable from a distant charging station 7 to any type of mixer, agitator or other machine 8 for operating upon a charge of material released thereto by the hopper. The upstanding hollow neck 9 of machine 8 is adapted to receive the charge. The hopper may be rendered movable in any suitable manner, for instance, by suspending it upon wheels 10 which may travel along a track or rail 12. As disclosed in Fig. 1, the machine 8 is about to receive a charge from the hopper, which may be presumed to contain a quantity of powder or any more or less finely divided material. The discharge end of the hopper accordingly is shown in closed position, and by preference, but not of necessity, the upper end of the hopper also is closed by means of a valve comprising a pair of pivoted doors 13. The doors are adapted to be opened automatically upon movement of the hopper to a position beneath the charging station 7; however, opening and closing of said doors may be effected manually, as may be readily understood. Under certain circumstances, the upper hopper valve may be dispensed with, due to the effectiveness with which dust from the material of the hopper is maintained under control in the inner structure of the hopper.

As is well known to persons skilled in the art to which the present invention appertains, the charging of any closed container with powdery material, especially when fed in large quantities, will result in a more or less violent displacement of dusty air from such closed container, which in this instance may be the mixer or other machine 8. If steps are not taken to arrest the escape of the dust laden air displaced by the entering charge, there is then created an objectionable condition in the vicinity of the charging operation. One of the objects of the present invention is to effectively eliminate the uncontrolled dust that generally occurs incidental to the charging of machines from a hopper. To this end, the hopper is provided with a dust flue 14, which may be in the form of a hollow tube of any desired cross-section, extending from the discharge port of the hopper to a point near the top of the hopper. The tube 14 being hollow, serves to convey dust laden air from the container 8, to a deflector or cap 15 which serves to project the dust laden air downwardly into the body of the hopper, so that the dust may enter the container 8 along with the material leaving the hopper. The dust deflector cap may be in the form of a cone mounted atop the flue part 14, with its lower edge 16 disposed below the top of part 14. The annular lower edge of the cap may provide a support for a depending porous sock or screen 17, which may be of woven fabric so as to perform the function of arresting movement of the dust particles, while permitting the passage of air therethrough. The dust particles may cling to the interior of the sock until they accumulate sufficiently to fall off by reason of their weight, or until the receptacle is jarred by opening and closing of its gates. The dust reflector cap may be frictionally mounted at the top of the dust flue, or it may be fastened thereto as desired.

The lower end of the dust flue is provided with an enlargement 18, to form a gate for closing the discharge port of the hopper. As shown, the enlargement is in the form of a hollow cone which is in fluid communication with the dust flue proper. In addition to performing the function of a gate or closure for the discharge port of the hopper, the funnel-shaped enlargement or cone performs also the function of collecting suspended dust from a large area of the interior of container 8, and directing said dust into the relatively constricted flue 14.

The dust flue 14 is mounted within the hopper for reciprocating movement vertically, a suitable sleeve 19 being provided to furnish a bearing within which the flue part may slide. The bearing may be supported in fixed relationship to the hopper by means of a supporting brace or spider, two legs of which are indicated at 20. From the foregoing, it will be understood that the charging gate of the hopper may be opened by merely lowering the dust flue and its associated hollow gate or enlargement 18, to permit the force of springs 21 to lower a sealing member 22 onto the upper edge of the receiving neck 9 associated with machine or container 8. This operation will be more fully described hereinafter.

Figure 2:
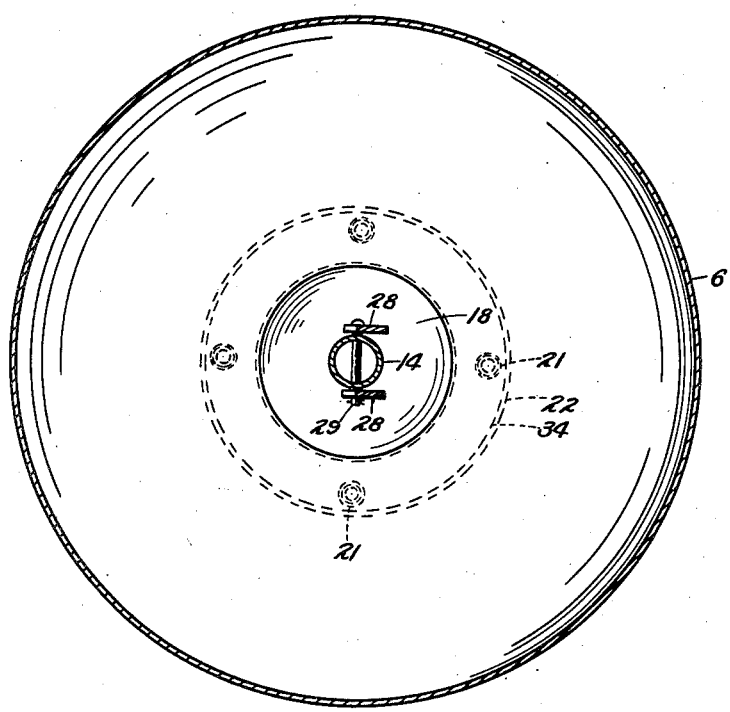
Fig. 2 is a cross-sectional view taken on line 2—2 of Fig. 1.

The dust flue 14 may be lowered and elevated in any suitable manner, there being shown for the purpose an endless chain 23 operating a chain pulley 24 which is fixed to an operating shaft 25 journalled for rocking movement upon a stationary part of the hopper. To the shaft 25 is fixed an arm 26 which carries a pivot 27 connecting the arm to a link 28. The end of the link opposite the connection at 27 is pivoted upon the dust flue 14 at the location 29. The link and arm arrangement is such that the centers of parts 25, 27, and 29 are aligned when the flue is elevated to its upper limit, thereby to form a dead-center lock against accidental lowering of the dust flue. As is most clearly shown in Fig. 2, the arms and links may be furnished in pairs, in the interest of smooth operation and proper mechanical design. The pivot pin 29 may extend through the flue part, as shown.

Attention is now directed to the lower portion of the hopper, beneath the downwardly and inwardly inclined wall 30. The lower end of the inclined wall is developed to provide a vertical discharge neck which may be in the form of a tube 31. The neck is loosely encircled by a telescopic member 32 of short tube formation, which may slide vertically along the discharge neck 31. The sealing member 22 is attached to the telescopic member 32, and may be faced with a suitable covering of gasket material 33 which is adapted to form a seal against the upper peripheral edge of the receiving neck 9. The gasket may also extend inwardly to the extent of providing a seat upon which the gate member 18 may bear. The springs 21, being compressed between the sealing member 22 and a stationary flange 34 of the hopper neck, serve to yieldably urge the sealing member and its gasket against the gate 18, and toward the receiving neck 9 of machine 8. The pins 35 serve as guides for the vertical movement of the sealing member and its associated telescopic part 32. The gasket 36 furnishes a fluid type seal between the hopper neck 31 and the telescopic member 32 and is attached to the latter.

From the foregoing, it should be readily understood that partial rotation of shaft 25 in a counter-clockwise direction will result in lowering of the dust flue 14 and the hollow gate 18, thereby permitting the springs 21 to lower the sealing member into contact with the upper circumferential edge of neck 9. Further lowering of the dust tube will dispose the hollow gate 18 to an open position within or below the neck 9, thereby releasing the charge from the hopper into the interior of machine 8. As the charge enters the machine 8, there will be a displacement of dust laden air which will be gathered by the extensive hollow cone or gate 18 and directed into the dust flue 14. The displaced air and dust, upon striking the dust deflector cap 15, will be deflected downwardly into the hopper, as previously explained. It should be noted that the sealing member, by reason of the construction described and illustrated, is self-adjustable to its seat upon the neck 9; in other words, the sealing member has a limited universal connection with the discharge neck 31 of the hopper. The guide pins 35 carry stops 37 for limiting downward movement of the sealing member, the stops in the present instance being easily removable cotter pins or their equivalent.

As was previously explained, the dust arresting means of this invention will, under most practical conditions, obviate the need for a closure at the top of the hopper; however, for purposes of sanitation and safety, a top closure is often considered desirable. Accordingly, we have provided an automatic top closure for the hopper, which comprises the pair of doors 13, each of which is fixed to a separate pivot rod or shaft 38, these shafts being journalled for rocking movement in opposite directions of rotation, by means of the geared connection 39. Each of said shafts carries a forked plate or bifurcated member, these being indicated by the characters 40 and 41, and each of said members is provided with a pair of upstanding lugs or ears 42. By reason of the geared connection between the shafts 38, a counterclockwise rotation of forked plate 41 will impart an opposite direction of rotation to the forked plate 40, and since said plates are fixed to their respective shafts, both doors 13 will be moved to an open position. Accordingly, movement of the hopper toward the right for placement thereof beneath the charging station 7, will result in the upstanding lug 42 of plate 41 being struck by a depending projection 44 at the charging station, whereupon said lug 42 will be moved toward the left for opening both doors 13. Movement of the hopper from the charging station will of course cause the stationary projection 44 to strike and move the lug 43 of plate 41, or the lug 42 of plate 40, depending upon the direction taken by the hopper in moving from the charging station.

Figure 3:
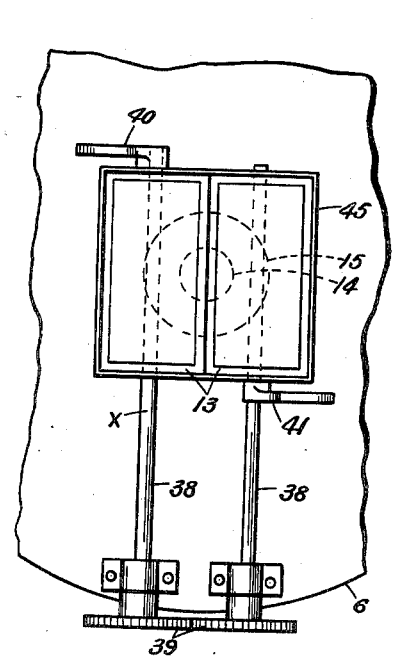
Fig. 3 is a fragmental plan view of the top of the hopper.

At this time, we desire to point out that the forked plates or bifurcated members 40 and 41 may be placed at any location upon their respective shafts, and it is not necessary to place them at opposite sides of the receiving port 45 of the hopper as disclosed in Fig. 3. When said members 40 and 41 are disposed as shown in Fig. 3, the depending actuator 44 at the charging station may be made in the form of a rod extending across the opening so as to be capable of striking either one of the bifurcated members. In installations where such a rod would be undesirable, separate actuator lugs may be furnished for independently actuating the members 40 and 41. The construction will depend largely upon the limitations as encountered under varying conditions of installation. When circumstances permit, the member 40 of Fig. 3 may be placed at approximately the location X, thereby enabling use of a single actuator 44 for both plates 40 and 41.

Figure 4:
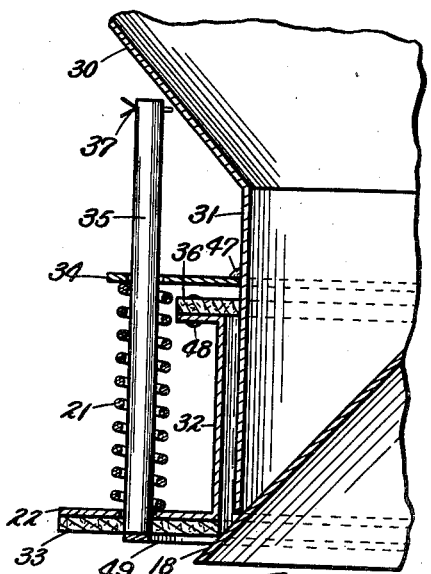
Fig. 4 is an enlarged fragmental cross-sectional view of the discharge end of the hopper.

In conclusion, it should be noted that the charging station 7, in its simplest form, may comprise an open frame, or a mere aperture in a ceiling 46. With reference to Fig. 4, the character 47 indicates a weld for the flange 34. Other details to be noted are the fastener 48, and a metallic ring 49 which carries the several upright pins 35, said ring serving also to support the sealing gasket 33. Said gasket, of course, may be fastened to the member 22 by means of rivets or other acceptable means, if desired. It is to be understood that various other modifications and changes in the structural details of the device may be made, within the scope of the appended claims, without departing from the spirit of the invention.

What is claimed is:

1. A charging hopper comprising a receptacle adapted to be supported in an elevated position, a discharge port for the receptacle including a relatively fixed hollow neck, a telescopic member mounted for shifting movement along said neck, and including a spring projected sealing seat reciprocable therewith, and a manually reciprocable discharge port gate movable to a seating position on the reciprocable seat and, on continued movement, shifting the reciprocable member against the resistance of its springs to retain said seating position until and after said gate is positively seated on said hollow neck.

2. A hopper comprising a receptacle adapted to be supported in an elevated position, a discharge port for the receptacle including a fixed hollow upright neck, a telescopic member mounted for shifting movement along said neck, a seal fixed on top of the telescopic member and slidable on said neck, resilient means for yieldingly urging the telescopic member downwardly along the neck, a seal fixed to the bottom of the telescopic member, a reciprocable gate arranged to seal the bottom of said telescopic member independently of the discharge port and to raise said telescopic member and also close the discharge port of the hopper, and link means disposed interiorly of receptacle for moving said gate toward and away from said port and said telescopic member.

3. A hopper comprising a receptacle adapted to be supported in an elevated position, a discharge port for the receptacle including a hollow upright neck, a telescopic member mounted for shifting movement along said neck, resilient means for yieldingly urging the telescopic member downwardly along the neck, a reciprocable discharge port gate normally holding the telescopic member in an elevated position in opposition to said resilient means, for closing the discharge port of the hopper, a dust flue fixed to the gate and extending therethrough directly to the top interior portion of the receptacle, and externally operable means including links connected to said dust flue for moving said gate from holding relationship with the telescopic member.

4. A hopper comprising a receptacle adapted to be supported in an elevated position, a discharge port for the receptacle providing a fixed valve seat, a combined dust control and valve element, reciprocably supported within the receptacle and comprising a hollow elongated flue pipe having an upper and a lower end, an apertured outwardly flared valve part fixedly mounted upon the lower end of the flue pipe with its aperture in fluid communicating relationship with the hollow interior of the flue pipe, said valve part being adapted to seat upon the valve seat of the receptacle discharge port, means to positively move said dust control valve element between said seat and a predetermined fixed distance limit beyond said seat, a reciprocable member, means yieldably urging the reciprocable member beyond said seat to a fixed distance limit spaced from the said limit of valve movement, said valve being retractable to seal said reciprocable member alone and jointly with the valve seat.

5. A hopper comprising a receptacle adapted to be supported in an elevated position, a discharge port for the receptacle providing a valve seat, a combined dust control and valve element, reciprocably supported within the receptacle and comprising a hollow elongated flue pipe having an upper and a lower end, an apertured outwardly flared valve part fixedly mounted upon the lower end of the flue pipe with its aperture in fluid communicating relationship with the hollow interior of the flue pipe, said valve part being adapted to seat upon the valve seat of the receptacle discharge port, and means for bodily reciprocating the flue pipe to seat and unseat the valve element relative to its cooperative seat upon the receptacle, and a spring projected sealing element surrounding the valve element and movable therewith for a positively limited distance to a sealing relationship upon a receiver for the hopper charge without unseating said valve element therefrom.

6. A hopper comprising a receptacle adapted to be supported in an elevated position, a discharge port for the receptacle providing a valve seat, a combined dust control and valve element, reciprocably supported within the receptacle and comprising a hollow elongated flue pipe having an upper and a lower end, an apertured outwardly flared valve part fixedly mounted upon the lower end of the flue pipe with its aperture in fluid communicating relationship with the hollow interior of the flue pipe, said valve part being adapted to seat upon the valve seat of the receptacle discharge port, a telescopic member spring projected toward said flared valve part for seating thereon during a predetermined portion of the movement of said valve part and an actuator including a series of pivoted members movable to a dead-center locking position to hold the flared valve part in seated relationship with the seat of the receptacle and to hold the telescopic member in sealed, retracted and extended positions independently of said receptacle seat.

7. In combination with a hopper having a valve seat, of a dust control and valve element for hoppers, comprising an apertured valve part, and an elongated hollow flue pipe fixed to the valve part in fluid communicating relationship with the aperture of the valve part, means supporting the dust control and valve element for reciprocating movement, means for reciprocating said element comprising a rock shaft extending into the hopper and a support therefor, an arm fixed upon said shaft, and a connecting link in the hopper having opposite ends pivoted to said arm and to said dust control and valve element, the pivots and the shaft axis being disposable to a dead-center locking position.

8. In a charging hopper the combination of a receptacle having a top charging port and a bottom discharge port substantially aligned with the charging port, a centrally apertured gate for said discharge port, a vertical dust flue fixed to the gate surrounding the aperture in the gate, said flue extending upwardly in the path of charging opening, a shield carried by the upper end of said flue and operating means comprising links connected to said flue within the receptacle for raising and lowering the flue and gate, said shield serving to direct material passing through the inlet toward the wall of the receptacle and said links serving to preclude bridging of material centrally of the receptacle above said gate.

9. In a device of the class described the combination of a receptacle, a fixed neck thereon defining a discharge port, a telescopic member on the exterior of the neck, means yieldingly urging the telescopic member downwardly of the neck, a flue member reciprocably mounted within said receptacle and neck, means for positively moving said flue member, and a gate for the discharge port fixed on the flue and seating the telescopic member and discharge member successively in the order named upon upward movement of said gate and flue.

10. A hopper discharge mechanism comprising a receptacle, a fixed depending neck providing a bottom discharge port, a telescopic member exteriorly of the neck, an upper seal member thereon riding on said neck, means urging said telescopic member downwardly of the neck, a gate member for closing the discharge port and having a flared portion projecting outwardly whereby to control movement of the telescopic member, a lower seal member on the telescopic member engageable with said flared portion of the gate, and a positively controlled flue member fixed on the gate for effecting retractive movement of the telescopic member in a sealed condition in advance of closing the discharge port.

11. A hopper discharge member comprising a fixed neck providing a bottom discharge port for a receptacle, a telescopic member slidable on said neck, spring means urging the telescopic member downwardly of the neck, means on the telescopic member and neck for positively limiting the movement of said member under the influence of the spring means, and a gate reciprocable axially of the neck for independently controlling the flow of substance from the open discharge port through said telescopic member and for jointly closing both the discharge port and said telescopic member while holding the telescopic member in a retracted position.

JOEL MOORES.
THOMAS P. McCLANAHAN.